(No Model.)
J. C. OHAVER.
WEATHER STRIP.
No. 507,922. Patented Oct. 31, 1893.
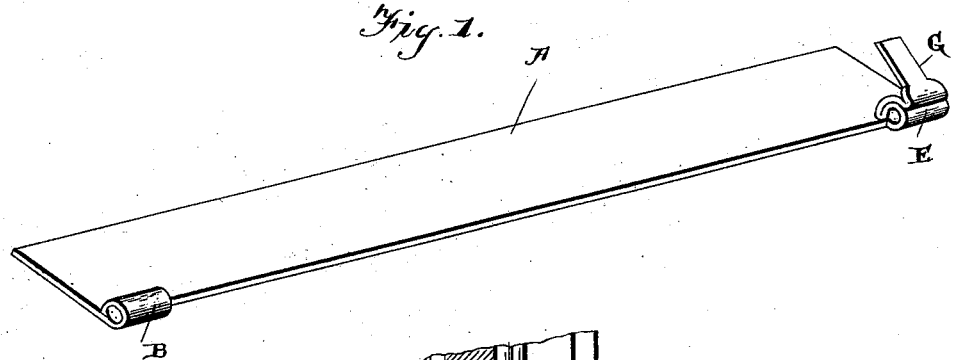
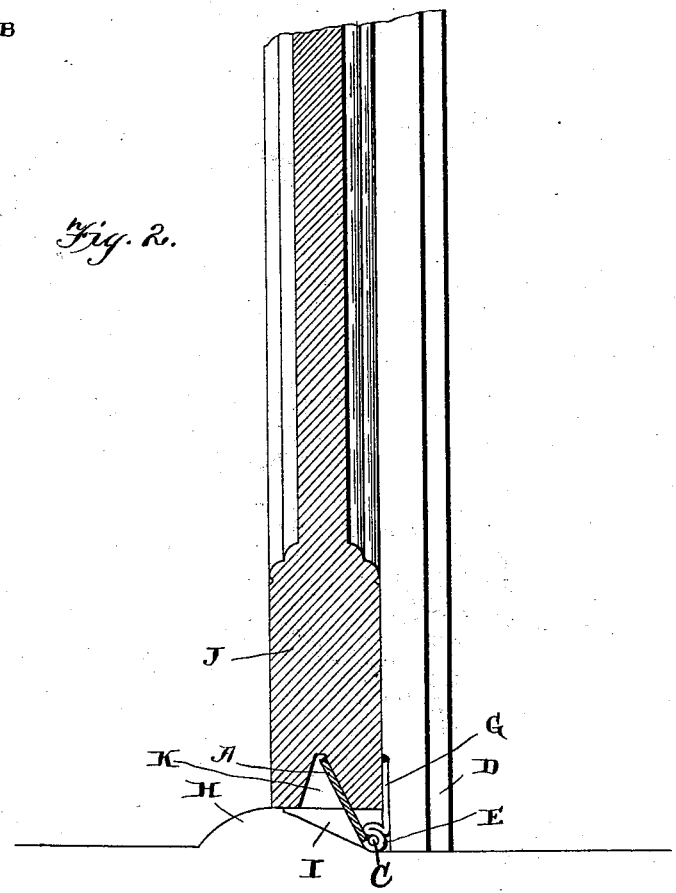
WITNESSES.
Geo. E. Frech.
Roland A. Fitzgerald.
INVENTOR
per Joseph C. Ohaver
Lehmann Pattison and Nesbit
Attys.

UNITED STATES PATENT OFFICE.

JOSEPH C. OHAVER, OF FOSTER, ILLINOIS.

WEATHER-STRIP.

SPECIFICATION forming part of Letters Patent No. 507,922, dated October 31, 1893.

Application filed August 5, 1893. Serial No. 482,473. (No model.)

*To all whom it may concern:*

Be it known that I, JOSEPH C. OHAVER, of Foster, in the county of Rock Island and State of Illinois, have invented certain new and useful Improvements in Weather-Strips; and I do hereby declare the following to be a full, clear, and exact description of the invention, such as will enable others skilled in the art to which it pertains to make and use it, reference being had to the accompanying drawings, which form part of this specification.

My invention relates to improvements in weather strips, and it consists in the particular construction and arrangement of parts, which will be fully described hereinafter and especially referred to in the claims.

The object of my invention is to provide a weather strip which is hinged at one edge and provided with an upwardly extending arm near the hinged edge, and at one end thereof, which arm is engaged by the base of the door being closed so as to move the free end of the strip up into a recess formed in the lower edge of the door.

In the accompanying drawings: Figure 1, is a detached perspective view of my weather strip. Fig. 2, is a cross section of the door frame with the door closed and the weather strip turned up in the recess formed in the lower edge of the door.

A represents a strip of metal which is provided at the edge of opposite ends thereof respectively with the eyes B and E, both of which are formed by lips which are doubled back as shown. The lip forming the eye E is longest and after being doubled into an eye is doubled back thereon and extended upward to form an operating arm G. Horizontal pivotal pins C extend through said eyes into the sides of the door frame. However, instead of forming these lips as a part of the strip they may be separate pieces which are soldered to the strip A.

The sill H of the door is cut out to form a recess I, in which the strip A rests as clearly shown in Fig. 2. When the strip A is down in the recess the operating arm extends inward over the strip, so that when the door J is closed the outer face thereof will engage the said operating arm, and lift the free end of the strip upward and into the longitudinal recess K formed in the lower edge of the door, thus making a weather tight joint between the lower edge of the door and the sill.

The length of the hinges, and the width of the operating arm, are such as not to extend out beyond the shoulder formed by the groove cut in the door frame, against which the door closes in the usual manner.

From the above description it will be seen that I produce a very simple and cheap weather strip for the lower edge of doors, and yet, one that will make a very tight joint between the lower edge of the door and the sill.

Having thus described my invention, what I claim, and desire to secure by Letters Patent, is—

1. The combination with a door frame, a door hinged therein having a longitudinal recess in its lower edge, and the sill having a recess in its upper face, of a weather strip having horizontal eyes at the ends of its outer edge and an upwardly extending arm near one of its eyes, and horizontal pins projecting from the sides of the door frame into said eyes, substantially as specified.

2. A weather strip adapted to be applied substantially as described, consisting of a plate having strips at opposite ends of one edge thereof, both of said strips doubled to form eyes and the end of one strip elongated and extended upward to form an operating arm, substantially as described.

In testimony whereof I affix my signature in presence of two witnesses.

JOSEPH C. OHAVER.

Witnesses:
JOHN A. SCHELL,
GEORGE W. KECKER.